US006974105B2

(12) United States Patent
Pham

(10) Patent No.: US 6,974,105 B2
(45) Date of Patent: Dec. 13, 2005

(54) HIGH PERFORMANCE VTOL CONVERTIPLANES

(76) Inventor: Roger N Pham, 2900 Socrates, Grand Prairie, TX (US) 75052

( * ) Notice: Subject to any disclaimer, the term of this patent is extended or adjusted under 35 U.S.C. 154(b) by 119 days.

(21) Appl. No.: 10/754,875

(22) Filed: Jan. 9, 2004

(65) Prior Publication Data

US 2005/0045762 A1    Mar. 3, 2005

Related U.S. Application Data

(60) Provisional application No. 60/438,809, filed on Jan. 9, 2003.

(51) Int. Cl.$^7$ .............................................. B64C 27/22
(52) U.S. Cl. ........................ 244/6; 244/7 R; 244/7 A; 244/12.4; 244/23 B
(58) Field of Search ........................... 244/6, 7 R, 7 A, 244/12.4, 23 B

(56) References Cited

U.S. PATENT DOCUMENTS

| | | | |
|---|---|---|---|
| 6,367,736 B1 * | 4/2002 | Pancotti ...................... | 244/7 R |
| 6,382,556 B1 * | 5/2002 | Pham ............................ | 244/6 |
| 6,607,161 B1 * | 8/2003 | Krysinski et al. ............ | 244/7 A |
| 6,896,221 B1 * | 5/2005 | Einarsson ................... | 244/7 C |

* cited by examiner

Primary Examiner—J. Woodrow Eldred

(57) ABSTRACT

A single-tilt-rotor VTOL airplanes have a tiltable rotor attached to an elongated power pod containing the collective and cyclical pitch mechanism, and transmission. The power pod is pivotably attached to a base that is slidably mounted on a pair of slotted guide beams attached on top of the roof of the fuselage. The guide beams run longitudinally from the front of the aircraft to past the center of gravity (CG) of the aircraft in order to transport the power pod from the front section to the center section when converting from the horizontal cruising mode to the VTOL mode. In the horizontal cruising mode, the power pod perched horizontally on top of the fuselage front section with sufficient clearance for the rotor to rotate in front of the aircraft. Upon transitioning to the VTOL mode, a telescopic actuator is used to pivot the power pod vertically while a cable-winch system is used to move the entire power pod and base assembly rearwardly to stop at the center of gravity of the aircraft, and vice versa, thus allowing the power pod to travel significantly rearward and forward as required for proper balancing of vertical lift as the power pod pivots 90 degrees during transition from VTOL mode to the cruising mode. A single piston engine, or a single or pair of turbofan engines, mounted slightly to the rear of the CG, have drive shafts that can be clutched and mated onto respective receiving shaft from the transmission within the power pod in order to power the tiltable rotor. The engine is also attached to a propeller for horizontal propulsion, or if turbofan engines are used, jet thrust is generated for horizontal cruise. A small anti-torque rotor or ducted fan toward the tail of the aircraft is mechanically coupled to the engine via a drive shaft to provide the necessary side-way thrust to overcome the main rotor's torque. In the horizontal cruising mode, the tiltable rotor is allowed to windmill slowly at a minimum rotational speed necessary to maintain the integrity of the rotor blades. The same propulsion principle can be applied to VTOL airplanes having more than one tiltable rotor, thereby can potentially increase the speed, range and reliability of current twin-wing-mounted-tilt-rotor aircraft. A pair of high-aspect-ratio wings on both sides of the fuselage provide highly efficient lift during cruising flight with very little induced drag. Conventional horizontal and vertical tail planes are used for directional stability in the cruising mode.

13 Claims, 7 Drawing Sheets

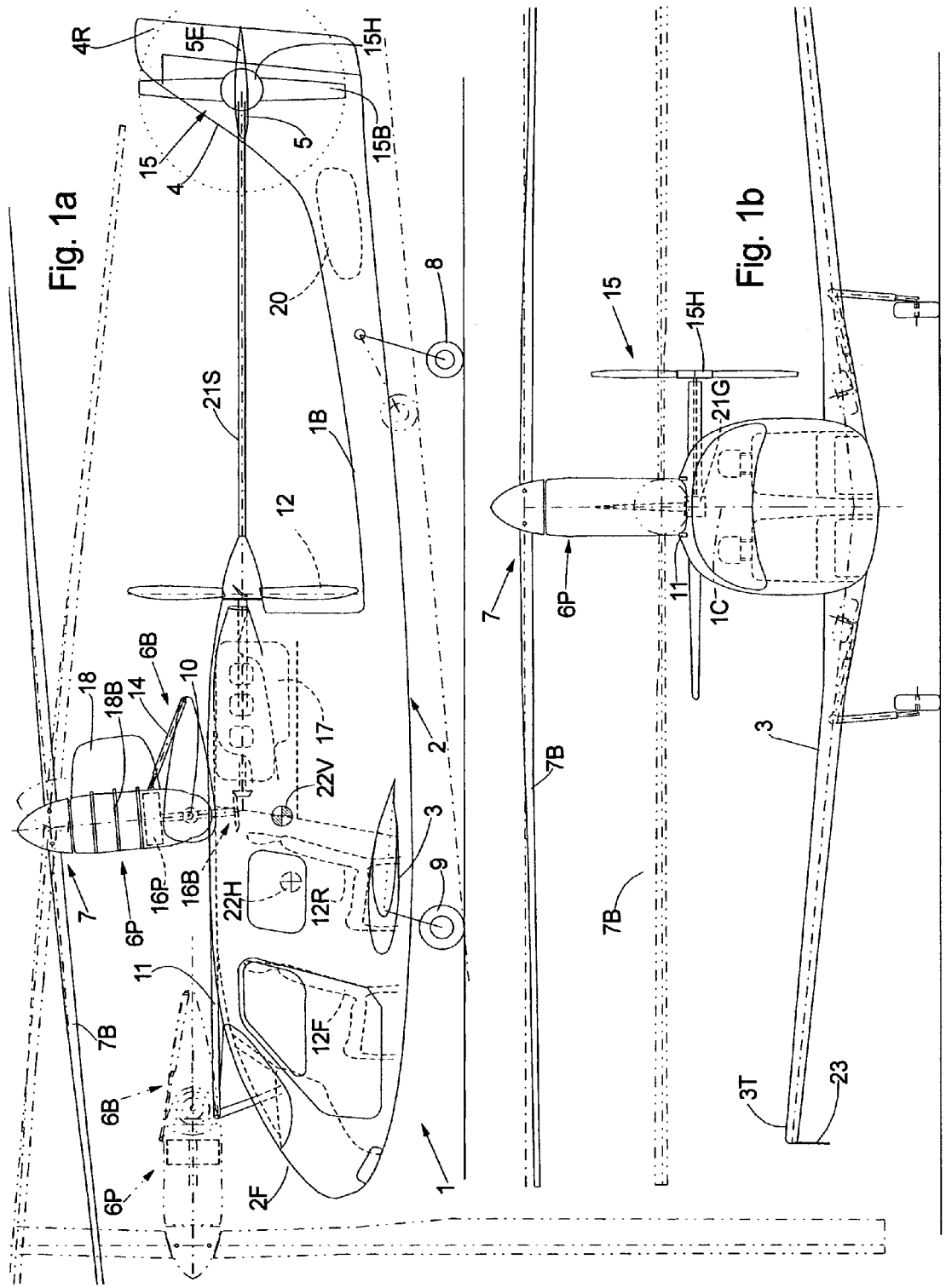

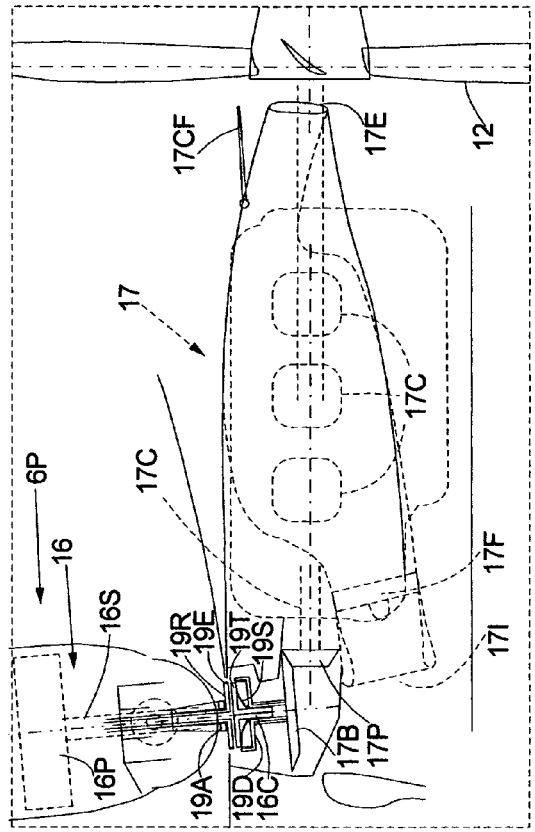
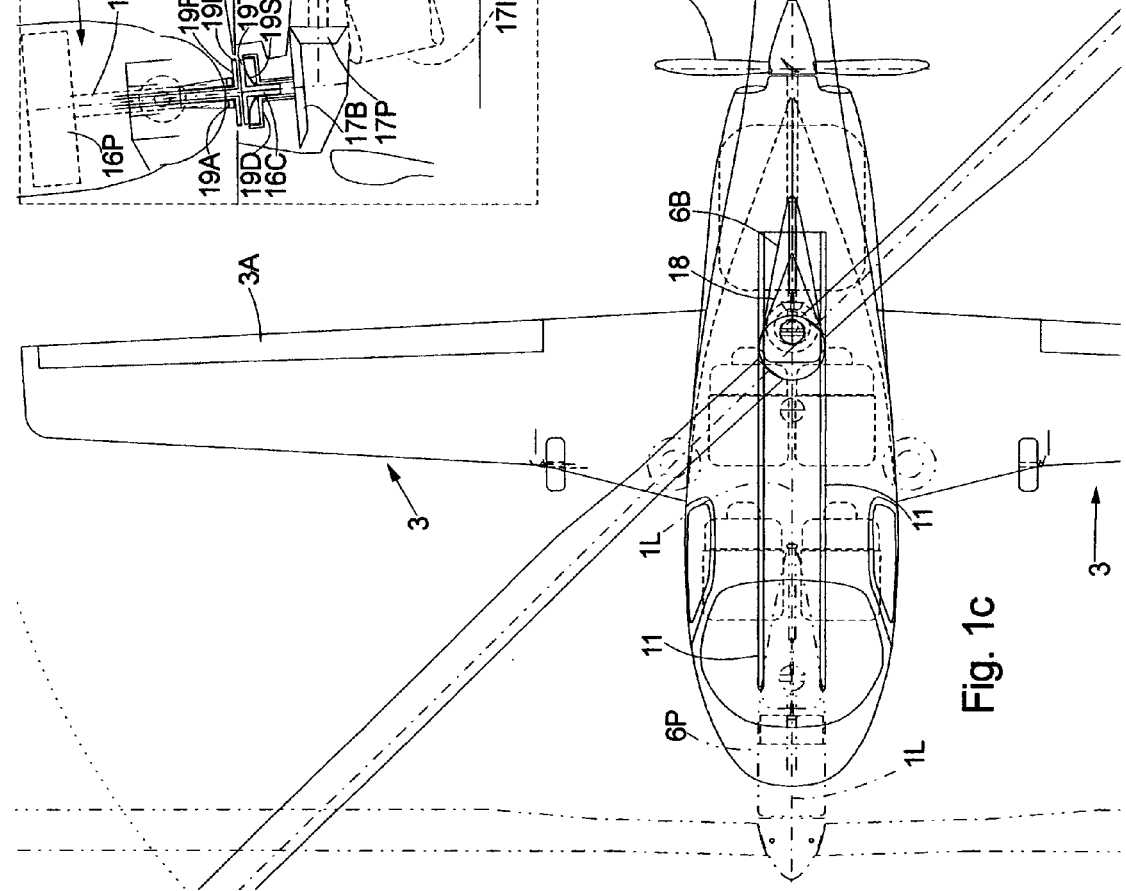
Fig. 1d
Fig. 1c

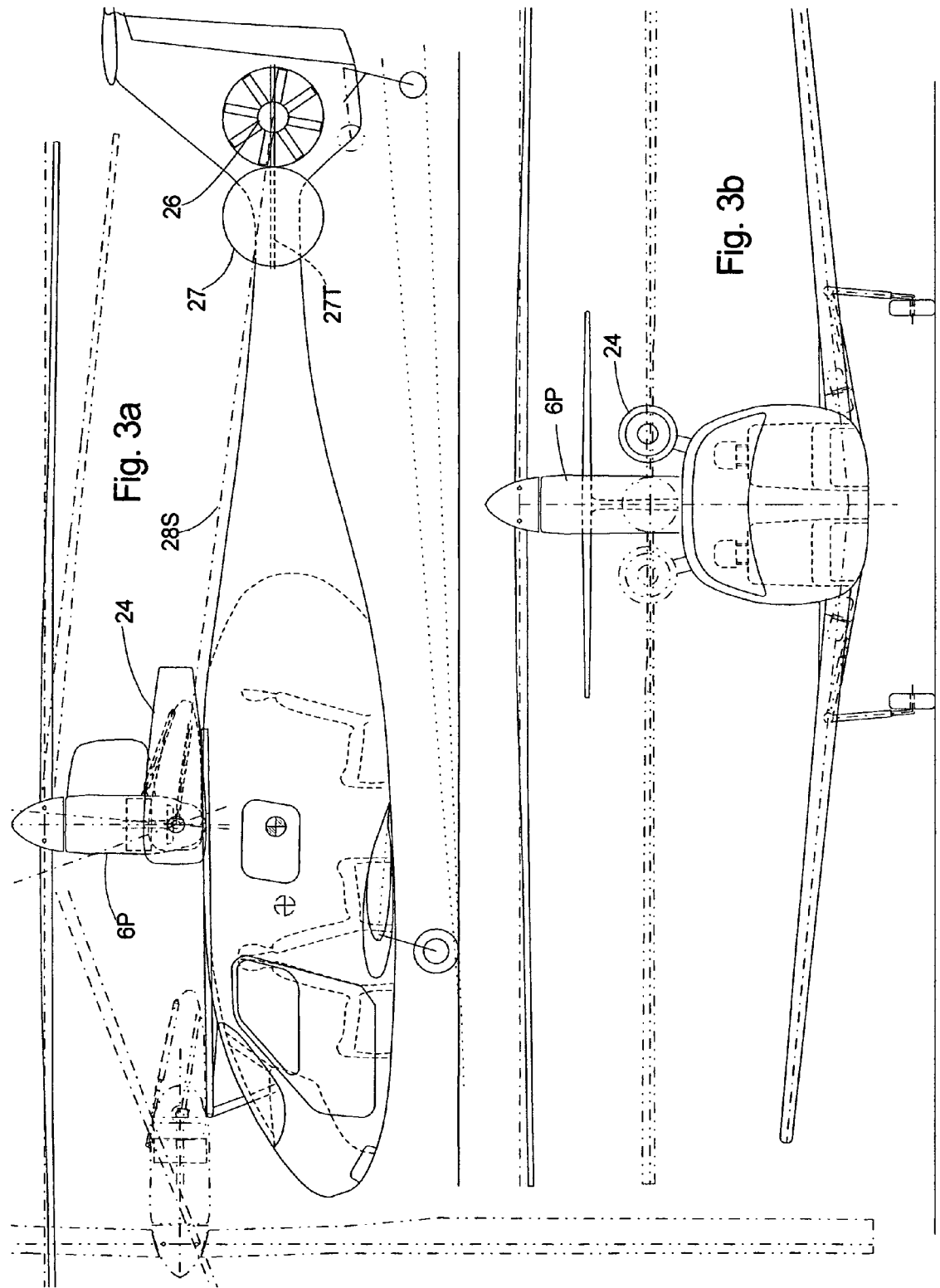

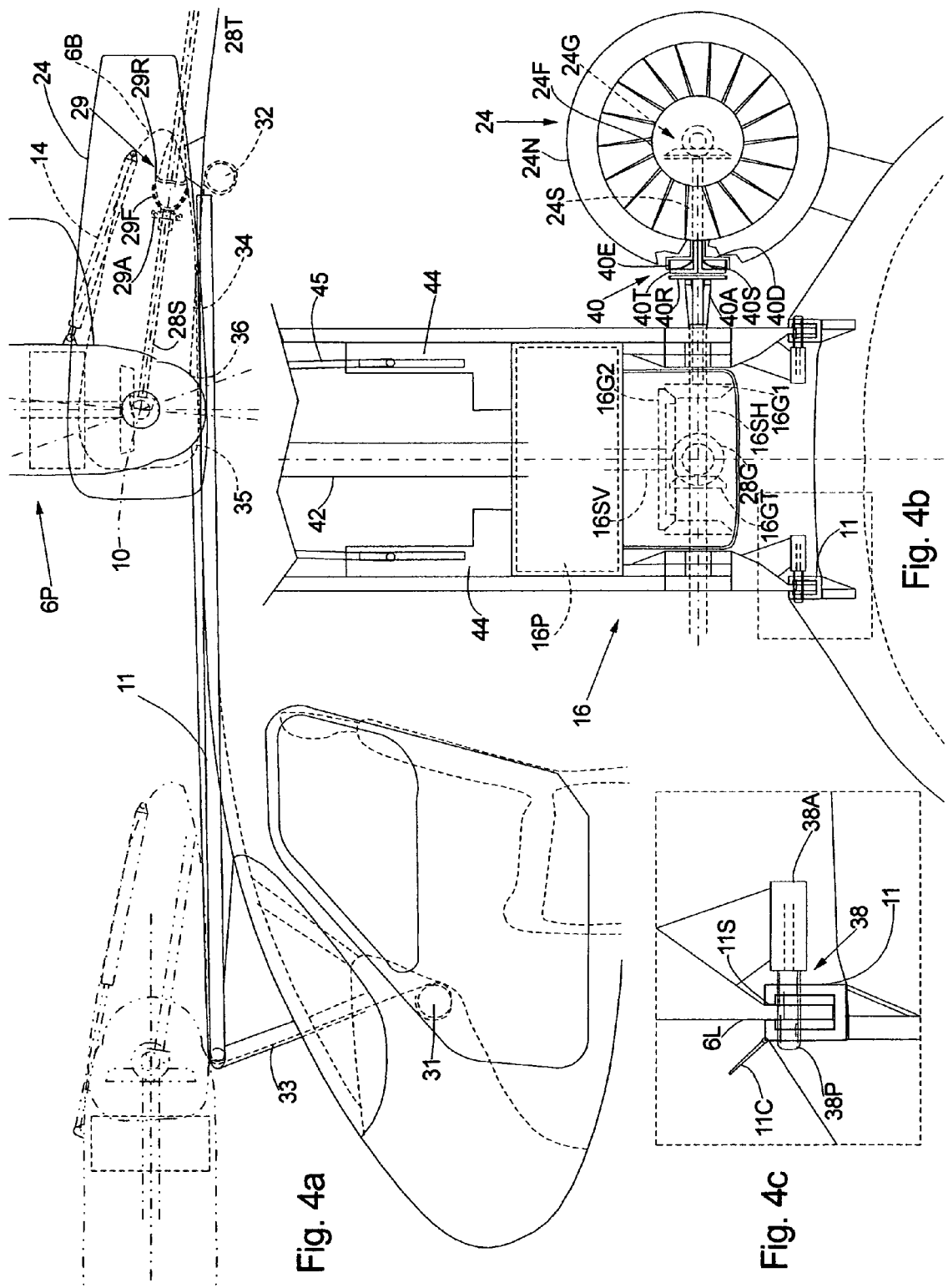

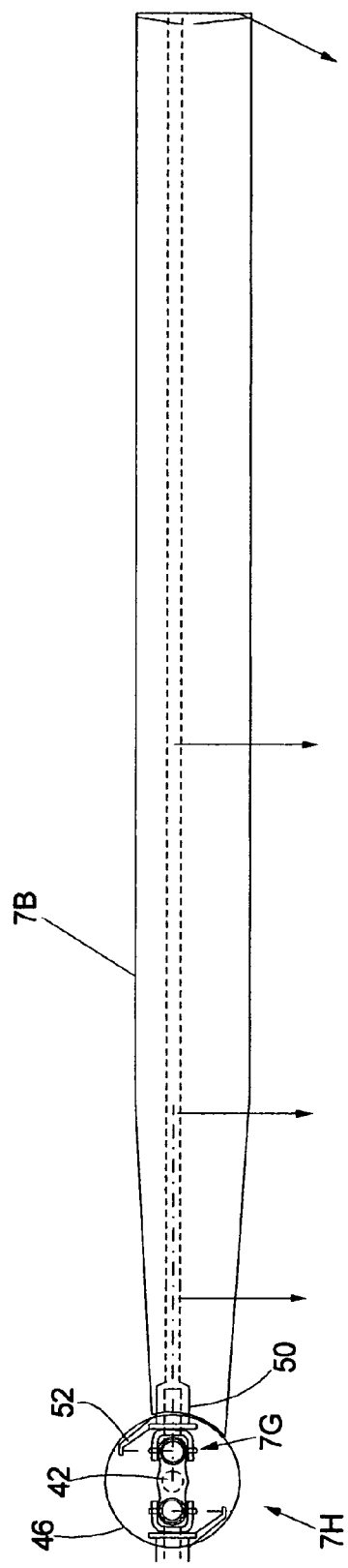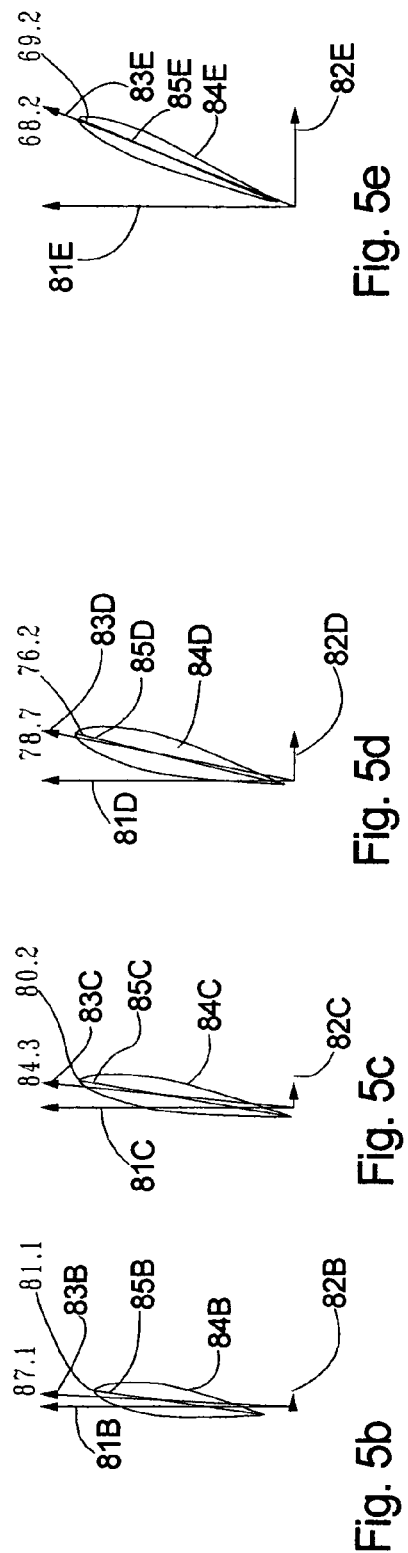

HIGH PERFORMANCE VTOL CONVERTIPLANES

CROSS-REFERENCE TO RELATED APPLICATION

This application claims benefit of Provisional Application Ser. No. 60/438,809 filed on Jan. 9, 2003 entitled "High Performance VTOL Convertiplanes."

BACKGROUND OF THE INVENTION

1. Field of the Invention

This invention pertains to vertical takeoff and landing (VTOL) airplane. More specifically, it pertains to a type of tilt-rotor VTOL airplane wherein large diameter helicopter-type of rotor is used for vertical lift, and which may be tilted 90 degrees forward during cruising flight when the aircraft is supported by conventional wings. In this invention, there is at least one large tiltable rotor attached to the aircraft provide vertical lift when the rotor is pointed upward and a separate means for providing horizontal thrust during cruise when the tiltable rotor is pointed 90 degrees horizontal, during which phase, the tiltable rotor is slowed down and is allowed to rotate at a minimum rotational rate adequate for maintaining structural integrity of the rotor blades.

2. Discussion of the Prior Art

Shortly after the airplane was invented, its disadvantage of requirement of a significant runway for takeoff and landing was quickly noticed, which significantly limit the airplane's utility. The helicopter was introduced afterward in order to overcome the limitation of the airplane. However, the helicopter has not received wide spread use but only in special roles that strictly require VTOL capability, and the helicopter numbers is but 1/10 that of the airplane. The helicopter flies too slowly and too inefficiently, with speed and range 1/2 to 1/3 that of the airplane, with 2 to 3 times the fuel consumption and cost of operation per passenger-mile. The helicopter is less safe per passenger-mile basis. According to NTSB statistics, the fatality rates for piston helicopters is 3–4/100,000 hrs and for light turbine helicopters 2–3/100,000 hrs where as the rates for a typical high wing airplane such Cessna 172 is 0.5 and Cessna 182 is 0.7/100,000 hrs. Light turbine helicopters have purchasing cost 2–4 times that of comparable piston airplane, but recently, the Robinson piston helicopters with their simplified rotor head design has brought down their purchasing cost to a level comparable with piston airplane.

In order to maintain the VTOL advantage of the helicopter while overcoming the helicopter's inefficiency and slow speed, there have been at least 50 different projects experimenting with high-speed VTOL aircraft by a large numbers of well known aerospace companies, proposing at least 12 different configurations in the last five decades. See, for example, "An Introduction to V/STOL Airplanes" by Iowa State University Press, 1981, or search the internet at http://www.vstol.org/. Today, there are only two VTOL transport airplanes that have sufficient merits to achieve production status, the military tilt-rotor Bell-Boeing V-22, and the civilian tilt-rotor Bell-Agusta BA-609 pending certification. On my last patent disclosure, U.S. Pat. No. 6,382,556, a single tilt-rotor VTOL design was disclosed which can improve the state of the art by potentially making VTOL airplane less expensive, more reliable and having more load capacity. However, my previous design relied on using the very large main rotor also as horizontal propulsion means in similar fashion as the V-22, which is less efficient and resulting in high level of adverse torque to the fuselage which must be overcome by the wing requiring more pilot's attention and making the wing less efficient. To be used as horizontal propulsion means, the main or lift rotor must have a highly twisted rotor blade downwardly from root to tip, and that will make the lift rotor somewhat less efficient in the VTOL mode, but far more importantly, the highly-twisted rotor blades cannot provide adequate autorotation performance in the same manner as would a conventional helicopter rotor in the event of engine failure. V-22 pilots are taught that in the unlikely event of failure of both engines, the aircraft should glide forward with the rotors in the horizontal orientation instead of attempting to autorotate with the rotors in the vertical orientation due to very high sink rate in the autorotation mode. If a suitably smooth landing site not found, a fatal crash landing will be likely due to the very high glide speed of the V-22 with very high wing loading and low wing aspect ratio. Thus, two engines must be provided for fail-safe purpose, which would be too expensive in a smaller size aircraft, or a provision must be made for variable twist in the rotor blade, which is difficult to do. A third reason for providing a separate horizontal propulsion means in a tilt-rotor aircraft would be to use a turbofan in order to increase the cruise speed of the tilt-rotor VTOL aircraft to a level comparable with current conventional turbofan jet aircraft. Propeller aircraft is limited to an efficient airspeed of around 350–400 mph, while a turbofan aircraft can cruise at 500 mph, due to the increase drag of the propeller tip when operating above the speed of sound. In the current tilt-rotor aircraft designs, the very large size of the rotor when used as forward propulsion device produces too much propulsion drag in the cruise mode, thereby limiting efficient cruise speed of current designs to around 300 mph.

Furthermore, the rotor tilting mechanism for a single-tilt-rotor airplane in this disclosure is an improvement from my previous design in that the it does not intrude into the center of the passenger cabin as did the previous design, while permitting nearly any type of engines to be used, ranging from the very bulky certified aircraft piston engine to twin turbofan engines. My previous single tilt-rotor design cannot utilize bulky piston engines and would be quite aesthetically-challenged even if compact twin turboshaft engines are used.

Thus the VTOL tilt-rotor airplane, the most successful VTOL airplane configuration, can be further improved as will be detailed within this disclosure in order to be simpler, cheaper, safer and having higher performance than current twin wing-mounted tilt-rotor design. It is hope that these major improvements in VTOL airplane design can make a significant impact on personal, business and commercial air transportation, thereby reducing the problem of airport congestion at large commercial airport and increasing rate of closure of small airports due to local political pressure favoring real-estate developers.

To my knowledge, there has not been any disclosure of VTOL single-tilt-rotor airplane having a separate means for horizontal propulsion in the cruising mode, while the main rotor is allowed to spin slowly at a minimum rate necessary for maintaining integrity of the rotor blades.

There have been unbuilt designs of twin wing-mounted tilt-rotor VTOL airplanes in the 1960's having the rotors stopped in flight after conversion of the rotors to the horizontal orientation, with the rotor blades subsequently folded into the engine nacelles for protection before accelerating to higher speed cruise, while turbofans are used for forward propulsion. Examples of such designs are the Sikorsky TRAC with telescoping rotor prior to rotor folding, the Bell T37 and D 272 designs with the rotor blades folded and trailed behind the engine nacelles, the Boeing USAF ARS (circa 1969), and numerous German designs of the same time frame. More details can be found at http://www.vs-tol.org/ in the section "Unbuilt V/STOL database." All of these designs were eventually abandoned, perhaps due to the complexity and the strength requirement of an inflight rotor blade folding system. Today, we only see V-22 and the BA-609, utilizing a pair of tiltable prop-rotor for forward propulsion as well as for vertical lift. The long and slender rotor blades are too fragile to be left standing still and unfolded in high-speed cruise. To my knowledge, there has been no proposal of tilt-rotor aircraft having a separate horizontal propulsion means and having the tilt-rotor fully extended in cruising phase while allowed to rotate slowly at a minimum rotational rate necessary for the integrity of the rotor blade. Yet, this very simple arrangement requires no complexity built into the rotor blade, while allowing a slender, light-weight and flexible helicopter-style rotor blades to be used with all accompanying advantages, for example, the thin and flexible rotor blades put far less stress on the rotor hub and rotor nacelles and all mounting structures in comparison to more rigid rotor blades required for a stopped and folded rotor system as proposed. In a single engine VTOL airplane, this very simple arrangement is a must in order to allow autorotation in the event of cease of operation of the single engine.

SUMMARY AND OBJECTIVE OF THE INVENTION

It is an object of this invention to provide a high performance VTOL airplane with purchasing cost and operating cost competitive with that of a conventional airplane of comparable load capacity.

It is another object of this invention to provide a high performance VTOL airplane with a single tiltable rotor that is safer than either a comparable helicopter or a twin-tilt-rotor airplane.

It is yet another object of this invention to disclose a rotary wing aircraft that is much more resistant to dynamic roll-over or to flipping over.

It is yet another object of this invention to disclose a separate means of horizontal propulsion for tilt-rotor VTOL airplane, thereby resulting in more efficient cruise performance while allowing more efficient vertical lift by using larger size rotor blades with low degree of root-to-tip twist optimized for vertical lift, in comparison to the rotor blades of current tilt-rotor aircraft with much higher root-to-tip twist and smaller diameter as required for adequate cruise performance, and permitting efficient autorotation allowing the use of a single engine thereby greatly reducing cost.

It is yet another object of this invention to disclose high speed VTOL airplane that can be powered by turbofan engines with speed comparable to current business jets, while having the high VTOL load capacity and high stability in the VTOL mode by the use of tiltable helicopter-style rotor system.

Further objects and advantages of this invention will become apparent after a consideration of the drawings and the ensuing description.

In summary, in order to achieve all of the aforestated objectives, the single-tilt-rotor VTOL airplanes of this invention have tiltable rotor attached to an elongated power pod containing the collective and cyclical pitch mechanism, and transmission. The power pod is pivotably attached to a base that is slidably mounted on a pair of slotted guide beams attached on top of the roof of the fuselage. The guide beams run longitudinally from the front of the aircraft to past the center of gravity (CG) of the aircraft in order to transport the power pod from the front section to the center section when converting from the horizontal cruising mode to the VTOL mode. In the horizontal cruising mode, the power pod perched horizontally on top of the fuselage front section with sufficient clearance for the rotor to rotate in front of the aircraft. Upon transitioning to the VTOL mode, a telescopic actuator is used to pivot the power pod vertically while a cable-winch system is used to move the entire power pod and base assembly rearwardly to stop at the center of gravity of the aircraft, and vice versa, thus allowing the power pod to travel significantly rearward and forward as required for proper balancing of vertical lift as the power pod pivots 90 degrees during transition from VTOL mode to the cruising mode. A single piston engine, or a single or pair of turbofan engines, mounted slightly to the rear of the CG, have drive shafts that can be clutched and mated onto respective receiving shaft from the transmission within the power pod in order to power the tiltable rotor. The engine is also attached to a propeller for horizontal propulsion, or if turbofan engines are used, jet thrust is generated for horizontal cruise. A small anti-torque rotor or ducted fan toward the tail of the aircraft is mechanically coupled to the engine via a drive shaft to provide the necessary side-way thrust to overcome the main rotor's torque. In the horizontal cruising mode, the tiltable rotor is allowed to windmill slowly at a minimum rotational speed necessary to maintain the integrity of the rotor blades. A pair of high-aspect-ratio wings on both sides of the fuselage provide highly efficient lift during cruising flight with very little induced drag. Conventional horizontal and vertical tail planes are used for directional stability in the cruising mode.

BRIEF DESCRIPTION OF THE DRAWINGS

FIGS. 1a and 1b show a side view and front view, respectively, of the preferred embodiment of this VTOL convertiplane, showing general layout.

FIG. 1c is a top-down plan view of this VTOL airplane, and FIG. 1d is a close up view of the engine and clutch means for transmission of power from the engine to the main rotor transmission.

FIG. 3a is a side elevation view of a turbofan version of the convertiplane, and FIG. 3b is a frontal elevation view of the same convertiplane.

FIG. 4a to FIG. 4c reveal details of power pod actuation mechanism necessary for conversion from VTOL to horizontal cruising mode, as well as power transmission from turbofan to main rotor.

FIG. 5a reveals some details of rotor hub mechanism, and FIGS. 5b to 5e show aerodynamic vector analysis of the main rotor blade sections at various distance from the hub when the main rotor blade is feathered but is slowly turning in cruising flight.

DETAILED DESCRIPTION OF THE PREFERRED EMBODIMENT

Overview

Figure 2A:
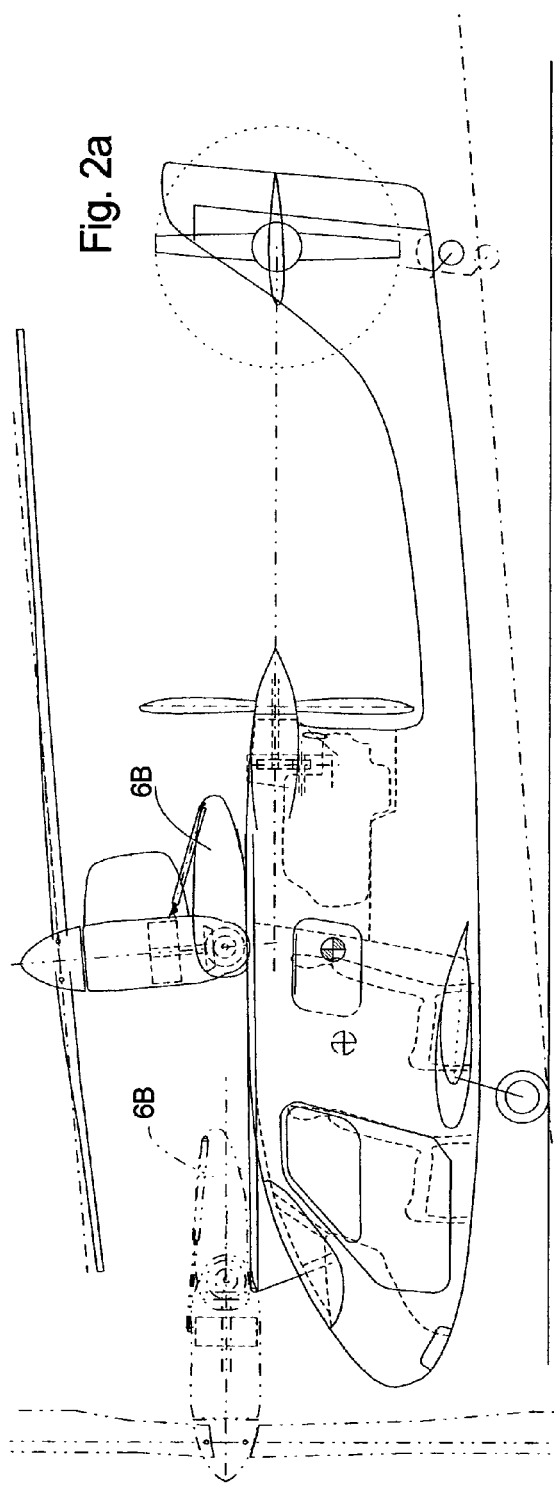
FIG. 2a is a side elevation view of a compact roadable or stowable version of the convertiplane.

Referring to FIG. 1a there is shown a 4-seat convertiplane designated in its entirety by reference numeral 1, with a fuselage 2, a pair of wings 3, conventional landing gear arrangement with a retractable rear wheel 8 and a pair of retractable main wheels 9, vertical fin 4 with rudder 4r, and a horizontal stabilizer 5 with elevator 5e as in conventional airplane arrangement. For a low Center of Gravity (CG) 22V with respect to the ground, a cantilever low wing configuration is selected. For motive power during cruising flight mode, a single conventional aircraft engine 17 mounted aft of the cabin directly driving a 4-blade pusher propeller unit 12. Propeller unit 12 is of variable-pitch design capable of zero pitch during the hovering mode and is featherable for maximum gliding efficiency in case of engine failure. Engine 17 is also connected to a bevel gear reduction unit 16B for vertical transfer of rotational power from the engine 17 to transmission 16P for turning a helicopter-style main rotor 7 mounted on top of power pod 6P for vertical lift. Main rotor 7 is tiltable by the pivoting action of power pod 6P on axis 10 disposed on the low end of power pod 6P. Axis 10 is housed inside pod base 6B slidingly mounted on top of a pair of guide beams 11 for transporting power pod 6P on top of the fuselage 2 and also serving as aerodynamic aft fairing for power pod 6p in the horizontal cruising mode. Guide beams 11 is disposed symmetrically on each side of the longitudinal axis 1L of the convertiplane. Tilting of rotor 7 is from a vertically oriented position for vertical take off, vertical landing or hovering, to a horizontally forwardly oriented direction for minimum-drag stowage during cruising flight. Rotor 7 is also tiltable 5–7 degrees past vertical toward the rear with rearward vector component for use in autorotation. Tilting means of pod 6P is by actuating strut 14 connecting pod 6P to base 6B. Please note the importance of pod base 6B and guide beams 11 as translational means for moving the rotor 7 forward and backward with respect to the fuselage along the longitudinal axis 1L of the fuselage, therefore allowing the power pod 6P to be substantially forward for proper propeller clearance with respect to the fuselage's front end 2F, resting on top of the fuselage in the horizontal orientation, and yet allowing the power pod 6P to be moved significantly rearward for proper balancing in the VTOL mode. This minimizes the vertical height of the rotor 7 with respect to the fuselage hence reducing the risk of tipping-over when parking on the ground or during vertical transition from the ground into the air. The rearward location of the prop-rotor in the vertical orientation is necessary for proper balancing of lift vector at the VTOL-mode center of gravity (CG) 22V. Please note that in the horizontal cruising mode when the power pod is moved to the front, the horizontal-mode CG 22H also moves significantly forward due to the substantial weight of the power pod and of the rotor up front. Detail mechanism and motive means for the pivoting action and translational movement of power pod 6P will subsequently be discussed in connection with FIG. 4a. In the VTOL mode, the power pod gets power from the engine 17 via a clutch as will be discussed in association with FIG. 1d. Inflatable fairing device 18 is needed to provide aerodynamic fairing aft of power pod 6P when power pod 6P is in the vertical position, in order to reduce drag in the climb phase and to minimize turbulence air flow to the pusher propeller unit 12 as well as to the vertical fin 4. Fairing 18 is made of a thin flexible triangularly shaped shell that is attached to power pod 6P via elastic bands 18B that wrap around power pod 6P. Inside the space between fairing 18 and power pod 6P are placed inflatable balloons or similarly functioning devices, that, upon inflation by a pressurized air source, will expand, pull, and uphold fairing 18 in position rearwardly. Conversely, upon deflation of balloons within, elastic bands 18B will pull fairing 18 forward and wrapping it around the rear circumference of power pod 6P, thereby reducing aerodynamic drag in the cruising mode.

Anti-Torque Tail Rotor

An anti-torque rotor 15, disposed at the tail end of the aircraft, is necessary to counteract the main rotor's torque. To power the tail rotor, an elongated shaft 21S transfers rotational torque directly from the engine 17 to the tail rotor gear box 21G, referring to FIG. 1C. A clutch means 21C disposed between shaft 21S and gear box 21G in order to disconnect the tail rotor 15 from the engine during cruising flight. The tail rotor is a rigid, non-flapping design for simplicity, if the tail rotor, hub, shaft and the tail boom 1B is be made sufficiently rigid and strong to overcome aerodynamic forces impinging on them during forward slow translational flight. At airspeed over 60 knots, there will be sufficient airflow around the vertical fin 4 to provide for anti-torque of the main rotor, since at that airspeed, the main rotor requires only half of the takeoff torque because the main rotor is only required to provide half of the lift required, while the wing 3 provides the rest of the total lift. The pitch of the blades 15B is made variable for control of the yaw axis during the hovering mode. With increase in forward speed, the vertical fin 4 of the aircraft is increasingly more effective in overcoming the main rotor's torque, especially with the rudder 4R trimmed toward the left side acting as flap thus increasing the lift coefficient of the vertical fin 4. Thus, with increase in forward speed, less force is needed of the anti-torque rotor 15, hence the pitch angle of the blades 15B is accordingly reduced. With reduced pitch angle, less asymmetrical forces resulting from lift differential between the leading blade and retreating blade with respected to the incident wind during forward flight, hence the stress to the tail section as the result of rigid hub design may be easily overcome given current high-strength carbon-fiver composite construction technology. When a speed is reach in which the vertical fin 4 can entirely compensate for the torque of the main rotor 7 with safety margin against stalling of the vertical fin, the tail rotor rotation can be stopped by a braking means (not shown) built into the tail rotor hub 15H, thus conserving energy and reduce wear on the tail rotor system 15 during normal cruising flight, after the clutch means 15C has disengaged the tai rotor from the engine. The tail rotor blades 15B may be stopped in the vertical orientation, thereby serving as a second vertical fin for increase in yaw stability, although the retreating rotor blade that is receiving reverse flow may be at risk for blade tip flutter, unless the blade and its respective pitch-control linkage are made very stiff by, for example, using carbon fiber composite construction. Otherwise, the blade can be stopped in the horizontal orientation, thereby avoiding the issue of retreating blade flutter due to reverse flow. An electronic position sensor (not shown) may be built into the tail rotor hub 16H in order to stop the blade in the proper orientation for cruising flight. The small size of the tail rotor 15 and the rigid construction ensure that it will not receive significant stress when stopped rotating in high speed forward flight.

To compensate for considerable change in the VTOL-mode center of gravity 22V position due to uneven loading of the passengers, a ballast tank 20 is desirable in the tail end of the vehicle. For convenience, this may contain reserve fuel capacity that may be shuffled back and forth from a pair of fuel tanks in the wing to the tail. In the event that the reserve fuel is used up, the aircraft will be nose-heavy but should still be controllable.

Referring to FIG. 1b, which is a front view of the tilt-rotor plane, please note the positions of the main rotor 7 in its vertical VTOL orientation and its alternative very-low-drag horizontal feathered position, the power pod 6, and tail rotor 15. At each wing tip 3T, a wing skid 23 of minimal size is provided to gently arrest dynamic rollover of the tilt-rotor plane without causing damage to the wing tip 3T. Wing skid 23 may be made from resilient material such as nylon, fiberglass or steel, and may be retractable upward and rearward during flight if desirable. Dynamic rollover in a helicopter happens when significant thrust is developed by the rotor and the rotor mast is tilted significantly before the helicopter lifts off the ground, producing a strong sideway acceleration from the top of the rotor mast that is resisted by the landing gear on the bottom, thus creating a very strong sideway rolling moment that is beyond the cyclical pitch control's authority of the helicopter. Due to the long span of the wing 3 and the soft resilient nature of wing skid 23, the dynamic rollover can be gently arrested while giving the pilot time to reduce collective pitch while applying cyclical pitch in the opposite direction to level the aircraft. Dynamic rollover happens quite frequently in helicopters during strong cross wind, in uneven terrain or in the hand of inexperienced pilot, and although nonfatal, it can be very expensive because the rotor and the transmission is ruined, forcing higher hull-damage insurance rates thus increasing the cost of operation for rotary wing aircraft.

FIG. 1c is a top plan view of the tilt-rotor airplane, showing its high aspect-ratio wings 3 and the ailerons 3a, seating arrangement and the tail rotor 15 layout. The ailerons 3a may also be used as flaps, or flaperons during the vertical take off phase or short take off phase in order to reduce main rotor's down draft force impinging on the wings, hence reducing loss in rotor's lift. Notice the location of guide beams 11 disposed on the top of the fuselage for supporting the migration of power pod 6P and pod base 6B from mid fuselage to front fuselage. The tail rotor unit 15 is shown mounted to the tip of the horizontal stabilizer 5 receiving rotational power from gear box 15G disposed at of the fuselage's tail end 2T. A drive shaft 25 connects the tail rotor 15 to the gearbox 15G.

Power Clutch and Engine Air Cooling Mechanism

FIG. 1d is a closed up view of the engine, engine to rotor clutch and engine cooling system. In the VTOL mode, the power pod 6P gets its power from the engine 17 via a pinion gear 17P originated from the engine crankshaft 17C, in turn, pinion gear 17P transfers power to a larger bevel gear disc 17B, for about 2:1 reduction in rotational speed. Bevel gear disc 17B splined to clutch input shaft 16C, originated from power clutch unit 19. Shaft 16C is connected to a power clutch unit 19 in order to allow for disconnection of power from the engine during transition to the cruising mode. Shaft 16C is splined to drum 19D that constitutes a main part of power clutch 19. Drum 19D is mounted flushed under fuselage roof top for aerodynamic streamliness. Splined to drum 19D is transmitting disc 19T that is pushed outward of drum 19D by a circular array of leaf spring 19S. Role of disc 19T is in initial transmission of power from shaft 16C to a receiving disk 19R for receiving power. Receiving disc 19R is slidingly splined to transmission input shaft 16S, and disc 19R is mounted flushed within power pod 6P and will be turned 90 degree horizontally as the power pod 6P is pivoted horizontally in cruising flight. Disc 19R will be pushed slidingly downward to meet transmitting disc 19T by actuator arms 19A mounted within the lower end of power pod 6P, when needing power from engine 17. Actuator arms 19A may be powered by either hydraulic means or electromechanical means not shown. Upon initial contact of disc 19R with disc 19T, there will be slippage or rotational sliding between the two discs until the angular rotation (RPM) of the two discs will match. Then, upon rotational synchronization of the two discs, the actuator arms 19A will move disc 19R further against leaf springs 19S into drum 19D. There will be matching teeth 19T between the periphery of receiving disc 19R and the inner circular wall of drum 19D for positive non-slipable power transmission from engine 17 to power pod 6P. The transmission unit 16 will receive power from engine 17 to deliver to the main rotor 7, initially, via the transmission input shaft 16. Shaft 16S and shaft 16C can only aligned when the power pod 6P is angled forward at 5–7 degrees to assist with horizontal thrust component for forward flight. Thus, power pod 6P must be securely locked in place at the proper angle via locking pins or similar mechanism prior to engagement of clutch 19. Once clutch 19 is engaged, the transmission input shaft 16S transmits power to a single-stage planetary gear reduction unit 16P for powering the main rotor shaft 42.

The piston engine is preferably of FAA-certified horizontally opposed air-cooled design due to the widespread familiarity and infrastructure and logistic support for those engines. Examples are Continental IO-550 or Lycoming IO-540 with six cylinders capable of 310 hp at 2700 rpm, or the recently-developed SMA turbodiesel 4-cylinder engine capable of 300 hp at 3000 rpm, directly driving the pusher propeller 12. Those engines must be cooled even while the convertiplane is hovering in place, requiring fans for forcing high flow volume of cooling air around engine cylinders. As shown, cooling air is sucked in via a pair of air-intake ducts 17I disposed on each side of the engine 17 by electric fans 17F. The ingested air will move upward around each engine cylinders 17C evenly for optimum cooling and when moving past the cylinders, the air will be forced to move horizontally to exit the rear engine via a pair of air exit ducts 17E. Similar to air-exit vents in conventional aircraft, the air exit ducts 17E is also equipped with cooling flaps 17CF that is widely opened at low airspeed and narrowly opened at higher speed for maximum efficiency and engine temperature consistency. The electric fans 17F can also be used in maintaining constant engine temperature by varying the current fed to the fans thus pump air in faster if the engine is too hot or to retard the in flow of air if the engine is too cool for example during rapid descent.

An Urban or Stowable or Roadable Version

Figure 2B:
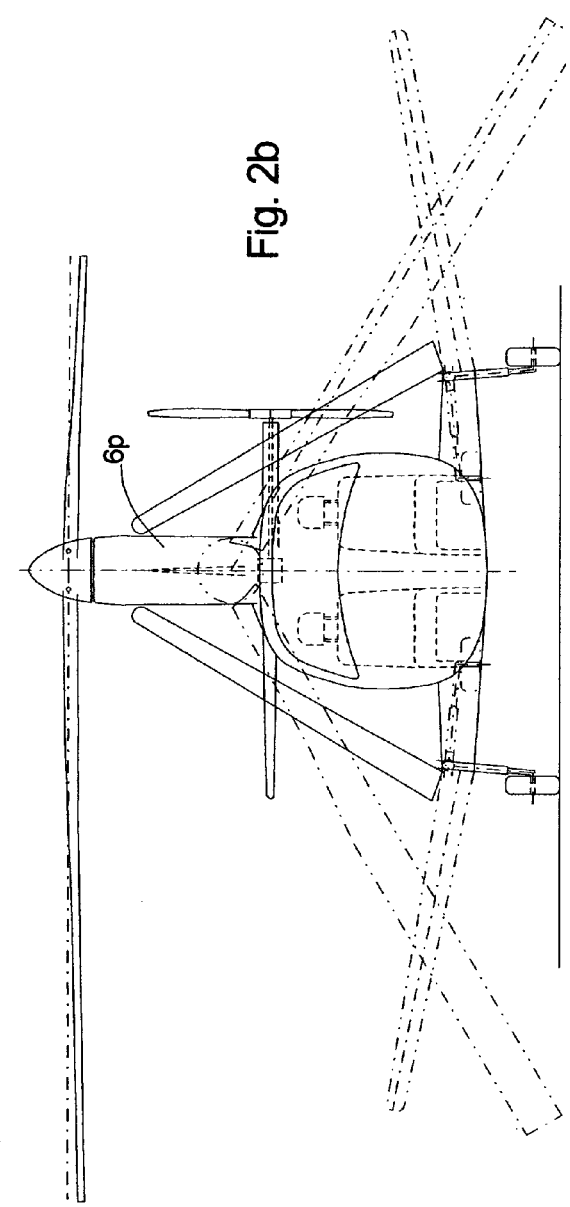
FIG. 2b is a frontal elevation view of the same convertiplane.

FIGS. 2a and 2b show a shortened version of the convertiplane more suitable for urban emergency missions, wherein it must be able to enter more confined areas, or for roadability in the street, or for deployment and storage aboard a small ship. A conventional three-bladed fully-articulated rotor is used, with rotor diameter reduced to 24 ft (7.3 m). For roadability and for maximum stowage, the rotor is foldable at the root portion of the rotor blade, with the blades overlapping the sides of power pod 6P. The power pod 6P is further pivoted horizontally, thereby maintaining a height lower than that of a conventional helicopter with foldable rotor blades behind the main rotor mast. The wings are foldable upward and toward the longitudinal axis 1L as in Naval carrier-based aircraft. The wing span is accordingly reduced to under 21 ft in order to keep the maximum stowable width under 8.5 ft (2.59 m) as requirement for driving in the road. The wing area is reduced to 60 sq.ft (5.57 sq.m) in order to maintain reasonable aspect ratio and to reduce the effect of wind turbulence on the aircraft during hovering. Furthermore, during hovering, the wings are folded upward, thereby reducing the lateral moment of inertia as well as the lateral moment arm whereby turbulent wakes can act upon the aircraft. For maximum power and minimum weight, the aircraft can be powered with an Allison 250 turboshaft of 450 hp (333 kw) weighing about 173 lbs (78.6 kg), and together with a minuscule airframe, allowing spectacular cruise speed projected to be around 280–300 mph at 8000 ft altitude. Speed is of course very important for many of helicopter's mission such as search and rescue, air ambulance, and criminal interdiction, but conventional helicopter design limits current helicopter dash cruise speed to no more than 130 mph. For use as a roadable aircraft, a Wankel-type of rotary engine of high power-to-weight ratio that can used automobile fuel would be preferable over that of a turbine engine or piston aero engine. As a roadable aircraft, the owner may park the aircraft in his back yard, drive it a short distance to a future neighborhood vertiport or an unused parking lot or football field and takeoff, or land the aircraft similarly and drive back home. For powering in the road, the rear wheel will be steerable and also be powered by a hydraulic motor embedded into the hub of the rear wheel serving also as bearing and hub for the rear wheel while directly turning the rear wheel, thereby saving weight and cost. Maximum ground speed in the roadable mode needs not be any higher than ~40 mph (64 kph) because there will be no need to drive it in the highway nor freeway when the aircraft can simply take off vertically and fly over it.

High-Speed Turbofan Version

For even higher speed, comfort, safety, and cruise altitude, it is possible to power this convertiplane design with a single or a pair of turbofan engines, as conventionally used in business jets. Referring to FIGS. 3a and 3b, this version of convertiplane has either one or two turbofan engines 24 mounted on top of the fuselage, lateral to each side of the power pod 6P, whereby rotational power from the spinning turbofan can be transferred into the power pod 6P via clutch and gear arrangement as will be discussed in connection with FIG. 4a and FIG. 4b. By mounting the turbofans above the fuselage, more internal contigous space is available for sitting of 6 people plus luggage, or a large space is available for the role of air ambulance, search and rescue or other special missions. One different between the turbofan and the propeller version is that the propeller version has the main rotor fixed at about 5–7 degrees forward tilt with respect to the fuselage when receiving power from the engine 17, referring to FIG. 1a, while the turbofan version has the main rotor continously receiving power from the turbofan 24 while freely pivotable up to 25 degrees of forward tilt—limited only by the clearance of the rotor blade against the front fuselage. This means that in a climb of high angle of about 12–14 degrees, the propeller version of the convertiplane must rely on propeller thrust for forward propulsion, since the main rotor's forward tilt of only 5–7 degrees when subtracted from the 12–14 degree climb angle would actually be pointing rearward with rearward thrust component of about 7 degrees that must be overcome by the propeller's thrust. In the turbofan version of the convertiplane, the turbofan's thrust production at low speed is too inefficient, meaning too much fuel is consumed per unit of thrust produced per unit time, therefore, if turbofan's thrust is used for climb, too much fuel will be consumed per amount of altitude gained. But by tilting the main rotor forward as much as 20–25 degrees, the convertiplane can climb at an angle of 15 degrees and still have as much as 10 degrees of thrust vector component from the main rotor, thus eliminating the needs for inefficient turbofan's thrust at low speed maximum climb regime. Thus, by utilizing main rotor's thrust for significant portion of the climb to cruising altitude, then, significant amount of fuel will be saved during a short trip. During a high-speed cruise at above 400 mph at high altitude, the turbofan's thrust production proves to be even superior to propeller's thrust production, thus making this convertiplane's arrangement the most efficient for either short or long trip. For overcoming the torque of the main rotor, the turbofan version will utilize a fan tail configuration commonly used in Eurocopter's design, instead of a conventional tail rotor. Advantages of the fan tail is that the fan unit 26 can be completely covered by a pair of round sliding doors 27 that can be slid rearward when sufficient forward speed has been attained, thus protecting the tail fan unit 26 from stress due to high speed wind at high cruise speed. Additionally, the tail fan unit 26 is safer for use in passenger air taxi role in comparison to an exposed tail rotor that people can accidentally walked into. Furthermore, the fan 26 is located much further away from the wake or tip vortices of the main rotor 7, therefore noise at takeoff or hovering will be significantly reduced, making this design more desirable in highly populated areas. It is also possible to power this version of convertiplane with a single turbofan engine, thereby saving weight and cost, since at takeoff, the power of a single turbine would be sufficient, while the second turbine engine is used for redundant backup in the VTOL mode and for faster cruise speed at higher altitude wherein output of both engines will be necessary due to the thinner air and higher airspeed requirement. If only a single turbofan unit is used, then the cruise speed will be slower and at lower altitude, thus requiring that the turbofan diameter be a little bit larger to maintain adequate cruise thrust and cruise efficiency. There will be a slight thrust asymmetry when only one turbofan unit is used, since it is mounted so near the centerline, but this is of no greater in magnitude than what pilots of single engine propeller aircraft are accustomed to adverse left yaw associated with climbing at low airspeed.

Power Pod Pivoting and Sliding Mechanism

FIG. 4a shows an example of a possible layout for power actuation of the pivoting and sliding of the power pod 6P in the turbofan version. As mentioned, power pod 6P is slidable horizontally from its rearmost location for use in VTOL mode, to its foremost location in front of the fuselage for cruising flight. Power pod 6P is also pivotable on axis 10 for converting between a VTOL mode and a cruising mode and for changing its thrust angle among various phases of flight. For example, an alternative position of power pod would be forward tilt at about 25 degrees for short take off and landing at greater gross weight rating than possible with vertical take off. Furthermore, with the power pod in the 90-degree vertical position, the convertiplane cannot climb well at optimal forward speed for maximal climb rate because then the wing would be at a low to negative lift angle when the tilt-rotor plane is canted forward to obtain forward thrust. Raising the nose of the aircraft in order to position the wing at favorable angle of attack would point the main rotor 7 rearward thus destroy necessary forward thrust. At low altitude and low airspeed, the turbofans 24 have very poor efficiency in thrust production. By using the main rotor 7 for forward thrust production at low airspeed, significant fuel efficiency can be achieved in short range operation in comparison to a conventional turbofan aircraft in which significant amount of fuel is wasted in the low speed takeoff, climb out or landing phase. The forward-tilted main rotor can provide thrust for a climb-out up to 15–20 thousand feet altitude at up to 200 kts, which is faster than the cruise speed of a helicopter because the main rotor 7 is significantly off loaded, and carrying only 25–50% of total weight of the aircraft, with the rest of the weight supported by the wing. As such, rotor blade flapping can be reduced and retreating blade stall can be avoided due to significant reduction in rotor loading. At higher altitude, depending on wing loading, the wing will stall at near 200 kts, forcing higher airspeed and thus requiring complete horizontal pivoting of the main rotor. At higher cruise speed at high altitude, the turbofan's superior cruise efficiency in comparison to a turbo-propeller propulsion will be reached, thus allowing for a very efficient aircraft in overall operation, in comparison to both conventional turboprop or turbofan aircraft. At low altitude, bird ingestion, as sucked in by the high reving turbofan, can cause significant damage including fan blades breaking up, engine explosion and fire that can result in loss of the aircraft. Turbofan engines thus must be made strong enough to survive a bird ingestion without causing major damage to the aircraft, and this has been very difficult for small sized turbofans, and can caused significant weight gain as well as cost increase. Due to the small size and ultra-light weight construction of the Williams FJX-2 turbofan, it not certain whether this engine can be designed to survive a bird ingestion. In this convertiplane design, a clutch means is used to disconnect the fan disc from the very high rpm of the turbine core engine in the VTOL and climb out mode of flight, thus preventing bird ingestion that can cause significant damage to the fan blade. Even a large bird hitting the slowly-rotating fan blades will likely cause no damage to the one-piece fan disc and blades due to its sturdy titanium construction, except may be locking it and preventing it from turning, nor any damage to the core turbine, because the fan blades will limit further entry of a large bird inside the turbofan tube. The aircraft can be landed vertically in order to remove the impacted bird and return to base for inspection. By tilting the power pod at ~25-degree angle with respect to the fuselage, the aircraft may be angled upward ~15–18 degrees and still receive adequate forward thrust from the main rotor which is now canted forward at about 7–10-degree angle which is typical of most helicopters. Thus as the aircraft travels forward at about 60–70 mph (96–112 kph) which is the optimum speed for most efficient main rotor translational lift, it also receives a significant proportion of its lift from the wing. When combining the two sources of lift, the aircraft can achieve higher climb rate for a given amount of horse power, or can tolerate greater gross weight rating in the short take off mode than in the vertical take off mode. This is possible because for a typical small aircraft such as the Cessna 182S or a typical helicopter such the Bell 206 Jet Ranger III, only 40% of the engine's maximum shaft horsepower goes directly toward producing the energy required for maximum climb rate, while the rest of the power is wasted in overcoming aerodynamic drags. A more efficient lifting system that allows the aircraft to achieve its maximum climb at lower airspeed, hence less parasitic drags, and with very efficient thrust production at low airspeed hence less induced drag, can convert more of the engine horsepower into climb rate. The high aspect ratio wing of this convertiplane is a far more efficient lifting device than a typical helicopter's rotor blades, and the huge propeller (main rotor) of this convertiplane is also far more efficient at producing thrust at low airspeed in comparison to the Cessna's propeller.

As shown, the power pod 6 is slidable front to back by means of pull-pull cables system powered by two power winches, 31 and 32. Cable 33 originates from winch 31 and is attached to point 35 at the end of power pod 6, for pulling the power pod to the front of the fuselage. Electrical wires connecting the cockpit to the power pod6P may also follow a route similar to cable 33 for entering the cockpit. Cable 34 originates from winch 32 and is also attached to the end of power pod via point 36 disposed at the rear of power pod 6P, for pulling the power pod to the center of the fuselage. As discussed earlier, guide beams 11 are necessary for sliding action of power pod6P as supported by base 6B. Referring to FIG. 4b, which is a front sectional view of base 6B and pod 6P, base 6B has a pair of shoes 6S slidingly fitted within guide beams 11 and are appropriately lubricated for low sliding friction. Referring to FIG. 4c, which is a closed up view, beams 11 each has an open slot 11S on top wherein inserts each leg 6L of base 6B. When not in used, the open slot 11S will be covered by slot cover 11C that is hingedly mounted on a side of beam 11 and can be swung open or shut by means of a servo mechanism (not shown). A very tight and stiff attachment of power pod 6P to the fuselage 1 is desirable in order to avoid unwanted harmonic oscillation that can be destructive and lead to premature wear of the parts involved. To provide a stiff attachment, a locking-pin mechanism 38 is provided in which there is a large diameter lock pin 38P that can traverse through a series of correspondingly aligned holes formed in the leg 6L and shoes 6S of the base 6B as well as in guide beam 11, effectively locking together the base 6B and guide beam 11 for a play-free attachment point. Guide beams 11 are in turned tightly fastened to the fuselage cross structural member by conventional method of fastening similar structures, thus allowing guide beam 11 to serve as a longitudinal structural member of the fuselage in order to reduce weight and cost. Lock pin 38P is moved linearly by actuator 38A that may be powered by hydraulic mechanism or by electromechanical mechanism as conventionally done in the art.

Pivoting action of the power pod 6P is actuated by a telescopic actuator 14 that can be powered by hydraulic means, pneumatic means or by electrical means via an electric motor and a jack screw mechanism. Within axis 10, there may be provided position-sensing devices (not shown) such as potentiometers or optical position sensors that can relay these information back to the electrical control circuitry for accurate control of pivoting action. Because both sliding action and pivoting action are mixed, there need be only a single control function in the cockpit for the pilot, in order to decrease the pilot's workload.

Power Clutch Details

Referring to FIG. 4b, there is shown detailed mechanism of the power clutch 40 for transferring power from the turbofan unit 24 to the main rotor 7 and tail fan 26. Rotational power from turbofan 24 is transmitted to power shaft 24S from bevel gear unit 24G that is connected to fan disc 24F via a clutch (not shown) that can disconnect the fan disc 24F from the power spool of the core turbine in the VTOL mode. Power shaft 24S is splined to drum 40D that constitutes a main part of power clutch 40. Drum 40D is mounted flushed within turbofan Nacelle 24N for aerodynamic streamliness. Splined to drum 40D is transmitting disc 40T that is pushed outward of drum 40D by a circular array of leaf spring 40S. Role of disc 40T is in initial transmission of power from shaft 24S to a receiving disk 40R for receiving power. Receiving disc 40R is mounted flushed to power pod 6P in cruising flight, and far away from drum 40D, but disc 40R will be pushed outward to meet transmitting disc 40T by actuator arms 40A attached to power pod 6P when needing power from turbofan unit 24. Actuator arms 40A may be powered by either hydraulic means or electromechanical means not shown. Upon initial contact of disc 40R with disc 40T, there will be slippage or rotational sliding between the two discs until the angular rotation (RPM) of the two discs will match. Then, upon rotational synchronization of the two discs, the actuator arms 40A will move disc 40R further against leaf springs 40S into drum 40D. There will be matching teeth 40E between the periphery of receiving disc 40R and the inner circular wall of drum 40D for positive non-slippable power transmission from turbofan 24 to power pod 6P. The transmission unit 16 will receive power from turbofan 24 to deliver to the main rotor 7, initially, via the horizontal transmission shaft 16SH. Shaft 16SH is splined to receiving disc 40R, and shaft 16SH is concentric with the power pod 6P's pivoting axis 10, thus allowing continous power transmission at all angles of pivoting of power pod 6P. Splined to shaft 16SH is bevel gear 16G1 that articulates with larger gear disc 16G2 for rotational reduction of rpm. Gear 16G2 is connected to vertical shaft 16SV to transmit power to a two-stage planetary gear reduction unit 16P for powering the main rotor shaft 42. It should be noted that even though the fan disc 24F is disconnected from the core turbine in the VTOL mode, it should still be turning but at a much lower rpm in order to provide some cooling for the core turbine, and to act as a centrifugal inertial particle separator to sweep away larger particles that can cause damage or wear to the high speed compressor blades or turbine blades within the core turbine. An electric generator with its core winding (not shown) embedded into fan disc 24F as is proposed in the FJX-2 turbofan design can be turned into an electric motor for powering the fan disc 24F in the VTOL mode. A second electric generator (not shown) connected to the main rotor's shaft 42, then, must be provided with for electrical power in the VTOL mode. This second electric generator can be used to provide backup electrical power even during the cruise mode when the main rotor is simply windmilling, in the event of failure of the main electrical generator in the single engine version.

Powering of Tail Fan Unit

The tail fan unit 26 receives its rotational power from the aircraft main rotor transmission unit 16. A 90-degree gear drive arrangement is used. Initially, power flows from a small bevel gear disc 16GT concentric to shaft 16SH and is splined to the same shaft, referring to FIG. 4b. Referring to FIG. 4a, gear disc 16GT then transfers its power to another gear disc 28G meshed at right-angle to gear disc 16GT. Gear disc 28G is connected to tail rotor shaft 28S for transferring power to clutch 29 which in turn, transfer power to another shaft 28T and finally to the tail fan unit 26. Clutch 29 is necessary to disconnect or connect power from transmission unit 16 to and from the tail fan unit 26 when the power pod 6P must move front or back during conversion from VTOL and cruise mode. Instead of being disc shape like most clutches, clutch 29 has at least two contacting components, front plate 29F and and rear plate 29R that must assume a parabolic conical shape for aerodynamic streamliness during cruise mode. An actuator arm 29A is used to move front plate 29F in contact with rear plate 29R for power transfer between transmission unit 16 and tail fan unit 26.

Main Rotor Blade Control Actuators

Surrounding main rotor shaft 42 are pitch-control servos 44 for cyclical and collective pitch control of the main rotor blades. These servos may be in the form of worm-gear driven by jack screws for linear output from a gear-reduced electric motor, as commonly used in the industry for controlling the movable horizontal tail surface of jetliners. Since there will be at least three pitch-control servos 44, if one should fail, there should still be sufficient cyclical control available from the remaining two to guide the aircraft to a landing. In addition, there should be at least two separate electrical systems such that if one fails, the aircraft should still be controllable with the remaining system. For cyclical pitch control, each servo will move differentially, and for collective pitch control, all the servos will move collectively as commonly used in helicopter practice.

Turbofan Power Plant

Also shown in FIG. 4a and FIG. 4b, the turbofan unit 24 is a representation of the currently being developed Williams FJX-2 turboshaft of about 700 lbs of static thrust at about 500 hp (375 kW) output. The FJX-2 is a revolutionary micro-size fan jet engine with diameter of only 14 inches (36 cm) and length of 41 inches (104 cm) which promises specific performance comparable to those of the large complex multi-stage axial compressor turbofans of the present. With future availability of the 500 hp Williams TSX-2 turboshaft engine, performance and affordability of the tilt-rotor plane will be very good as the new-design FJX-2 promises significantly lower costs, much better fuel economy and much lighter than the older design Allison 250 series. Recent development has cast doubt on whether the FJX-2 can truly deliver the 700 lbs of static thrust as advertised. However, even if the FJX-2 can only reliably deliver 350 hp and 500 lbs of static thrust, this would still be quite good for a micro-turbofan weighing merely 85 lbs, given the small size and very efficient design of the turbofan version of this convertiplane design. For cruising, not too much thrust would be needed if the design is a very efficient one. High thrust would be needed for a short takeoff run or for a rapid climb out, especially the ability to maintain modest climb rate with one engine flamed out. But, with the main rotor 7 providing forward thrust for takeoff and most of the climb phase utilizing power output from only one 350 hp engine, the low static thrust available from the turbofans would be a moot point.

Given the small size and light-weight of this tilt-rotor convertiplane design, the transmission needs to handle only 300–350 hp maximum, hence allowing the twin 350 hp engine to be operated at only ½ power during the critical takeoff or hovering phase. This allows 100% back up ability in case of an engine failure during VTOL mode, in which case, the remaining engine will only needs to be throttled up to its maximum rated output. This enhances engine reliability, longevity and safety, and furthermore allows for adequate high-altitude performance, which translates to high cruise speed with low fuel consumption.

Rotor Head Details

FIG. 5a reveals enlarged details of the rotor head 7H and rotor blade articulation and pitch control arms. For efficient forward cruising flight, a spinner 46 is used to cover up the rotor head mechanism, thus necessitating a compact rotor head design. The fragile and slender power pod design would favor a rotor head design with minimum shakes and vibration. Furthermore, for horizontal cruising flight, the rotor blades are essentially feathered to minimize aerodynamic drags. However, the rotor blades cannot be stopped because doing so would require a rigid rotor blade construction that can increase weight and imparting significant degree of force to the fuselage due to their large size when flying through turbulent air. The rotor blades then should best be rotating at a low rpm yet sufficient for centrifugal force from the blades' tips to overcome aerodynamic resistance of the blades and other forces that can lead to lost of structural integrity of the blades such as blade tip fluttering at high cruise speed. The blade pitch will be set at a maximally high pitch that will permit rotation of about 100 rpm. This is about ¼ of the rpm at takeoff, which is about 420 rpm at takeoff, therefore the centrifugal force generated by the tips of the blades would be less than 1/16 of the blades' centrifugal force at takeoff rpm. At takeoff, the blades' centrifugal force must be strong enough to support the weight of the entire aircraft against upward bending forces at the blades' roots. At cruise, with the rotor at horizontal position, the aerodynamic drag will want to bend the blades rearward, but it is calculated that the aerodynamic drag of the blades at cruise is will be far less than 1/16 of the aircraft weight at takeoff, so there should be no problem with keeping the blades stable even at a very low 100 rpm rotational speed. Air turbulence encountered during cruising flight will want to bend the blades within the plane of rotation as well, necessitating the blade root to be articulated in the lead-lag direction in order to to negate transmission of turbulent wind forces to the fuselage front section as well as stress fatigue at the blade root if the root is made rigid. For all above purposes, the best type of rotor hub configuration would be of the fully-articulated type similar to those of Enstrom or Schweizer Helicopters. The forces of turbulence impacting the blades in cruising flight will be absorbed by the fully-articulated rotor design, thus ensuring comfort to the occupants as well as reduced stress on all mounting structures of the power pod 6P, allowing light-weight construction.

Referring to FIG. 5a, there is shown the rotor hub 7H, with the main rotor shaft 42 at the center, and on each sides of the rotor shaft are mounting gimbals 7G for the blades allowing freedom of movement on two axes simultaneously, flapping up and down perpendicular to the plane of rotation, or lead and lag within the plane of rotation. Lead-lag hinges and dampers (not shown) as conventional in multi-blade helicopter rotor would also be necessary as in helicopter practice. Pitch-controlling arms 52 emanating from pitch controlling hub 50 are shown, as is standard helicopter practice.

Feathering and Slow Turning of Main Rotor During Cruise

Since the main rotor does not provide neither thrust nor lift during high speed cruise, it should be feathered, meaning it should have near maximum pitch to allow it to windmill at a lowest rpm possible that is necessary to maintain the integrity of the rotor blades, in order to minimize aerodynamic drag for a fast cruising aircraft. Due to the slender and flexible main rotor design, the rotor blades cannot be stopped completely, but must remain in constant rotation so that the centrifugal force can maintain blade stability against wind forces. In FIG. 5b-FIG. 5e, there are shown vector diagrams of cross-sectional airfoil of the main rotor blade and relative wind velocity vector as the feathered main rotor blade 7B encounters during fast cruise at 250 mph, at 12.5%, 25%, 50% and 100% of rotor's radius distance from the rotor's center, respectively. Vectors 81 B–81 E represent forward airspeed velocity component of the aircraft, vectors 82B–82E represent rotational velocity component of the blade at respective locations, and vectors 83B–83E represent the resultant airspeeds velocity that the blade airfoil profiles 84B–84E encounter at that respective locations. In FIG. 5b, the forward speed is given to be 250 mph as represented by vector 81B, and the rotational speed component at 12.5% of rotor radius is only 12.5 mph, with a resultant wind velocity vector 83B angled at 87.1 degrees. However, the blade airfoil's chord line 85B must assume a negative 5 degree angle of incidence with respect the resultant wind velocity vector 83B, at 82 degrees, for reasons to be discussed. In FIG. 5e, the rotational speed component at the tip is 100 mph, and the resultant wind velocity vector 83E is angled at 68.2 degrees from horizontal, with the blade airfoil's chord line 85E having a positive one degree angle of incidence, at 69.2 degrees. Substracting 69 degrees chord line angle at 12.5% location from 82 degrees chord line angle at 100% location will give 13 degrees, representing the blade twist angle from tip to root. This 13 degrees of blade twist will give a near optimum vertical thrust in the VTOL mode, as well as acceptable autorotation performance in the event of engine failure. This degree of blade twist compares quite well to single-engine helicopters having blade twist at 8–10 degrees. If the blade chord line 85B at 12.5% location is made parallel to the resultant wind velocity vector 83B, then the blade chord line 85E at the 100% location must also be made parallel to the resultant wind velocity vector 83E in order to maintain a balance of lift distribution, thus necessitating a blade twist of 19 degrees when substracting 68 degrees from 87 degrees, and this high degree of blade twist will cause a reduced efficiency at autorotation as well as reduction of lift in the VTOL mode for a minor reduction in drag at cruise. The blade airfoil profile at root 84B is a thick symmetrical section similar to the NACA 65-021, at 21% thickness, thus still have reasonably low profile drag even at 5 degrees of angle of incidence and at a lift coefficient of about 0.5. The root of the rotor blade extend right to the hub and spinner 46 in order to avoid tip vortec drag, which would be considerable at this angle of incidence. The blade airfoil profile at tip 84E is a thin symmetrical section similar to NACA 64-010 at under 10% thickness, and at 1 degree of incidence, should have minimum vortec tip drag. It should be noted that for a larger twin turbofan version which should be able to cruise at or under 470 mph due to compressibility reason, the blade airfoil should be adapted for operation at higher Mach number, with the tip section being supercritical airfoil section, and that the blade twist and the blade pitch when feathered at horizontal high speed cruise should be optimized for near-zero angle of incidence of both the tip and the root region in order to minimize potential for blade tip flutter or other mode of vibration due to such a high cruise speed and compressibility problem inherent near the transonic zone.

When properly designed, a feathered but slowly rotating main rotor should have very little drag increased above the profile drag and the wet area drag of the blades, hub, and power pod. To ease cockpit workload on the pilot, the onboard microcomputer can be assigned the task of monitor the rotational speed of the feathered main rotor and to adjust the pitch to compensate for change in rotational speed in order to avoid decay in rotational speed that can lead to blade instability at too slow a rotational speed. When the airspeed of the aircraft decreases, the main rotor blade pitch should be accordingly increased in order to maintain a rotational speed conducive to blade stability and integrity.

Twin-Wing-Mounted Tilt-Rotor Convertiplane with Slowly Turning Rotor Blades in Cruise The concept of a convertiplane powered by turbofan engines yet capable of VTOL flight by helicopter-type of rotor is not limited to single tiltable rotor convertiplanes, but can also be adapted to twin-tilt-rotor design, for example, the Bell-Boeing V-22 or the Bell-Agusta BA-609 civilian tilt-rotor. The current V-22 is limited to a cruise speed of 320 mph at optimum altitude, even though it has a high power to weight ratio, comparable to most current turbofan jet aircraft that can cruise at 500 mph or more. This is because the huge aerodynamic profile drag that the very large rotors incur during forward cruising flight, thus making them inefficient for high speed propulsion. For flight above 400 mph, turbofan jet propulsion method has proven to be even more efficient than conventional turboprop aircraft with much smaller propellers than the prop-rotors of the V-22. The BA-609 is projected to be able to cruise at only 280 mph, even though business jets of similar size and power-to-weight ratio can cruise at 450 mph. Therefore, by substituting the pair of turboshaft engines as used in current tilt-rotor aircraft with a pair of turbofan jet engines while feathering the pair of tilted rotors and allowing them to rotate at a slow rpm necessary to maintain the structural integrity of the rotor blades in cruising flight, much better propulsion efficiency at speed above 400 mph will be realized. This will allow current tilt-rotor aircraft designs to be capable of up to 470 mph. The limitation here is not due to installed horsepower, but due to compressibility effect of the unswept rotor blades and wings. To cruise at above 500 mph, as current airliners are capable of, requires swept wings and rotor blades, which is not practical from a design perspective for tilt-rotor aircraft. The different between 470 mph and 550 mph will hardly be noticeable in short to medium range operation as in most domestic flights. To make up for the drag of the feathered rotors and power pod, the wing of a typical tilt-rotor aircraft can be made ⅔ the size of the wing of a comparable turbofan aircraft, because a typical turbofan aircraft has wings that are sized for minimum takeoff or landing speed and distance, and in cruising flight, the wings tend to be larger than necessary. Likewise, the size and hence static thrust of current twin-engine turbofan jets are significantly larger than required for cruising flight, but required for a reasonable takeoff distance and safe climb rate in the event of failure of one engine, with increased in propulsion drag at cruise hence a small reduction in efficiency at cruise being a necessary tradeoff. In the tilt-rotor design, smaller turbofans optimized for maximum cruise efficiency with lower cruise drag can be realized, since the rotors supply nearly all the thrust for takeoff and climb out while the turbofans are used only for final climbout at high speed and higher altitude. The two combined reasons implicate that there will be hardly any reduction in cruise efficiency in a turbofan-powered tilt-rotor convertiplane in comparison to a comparable turbofan jet.

Figure 6:
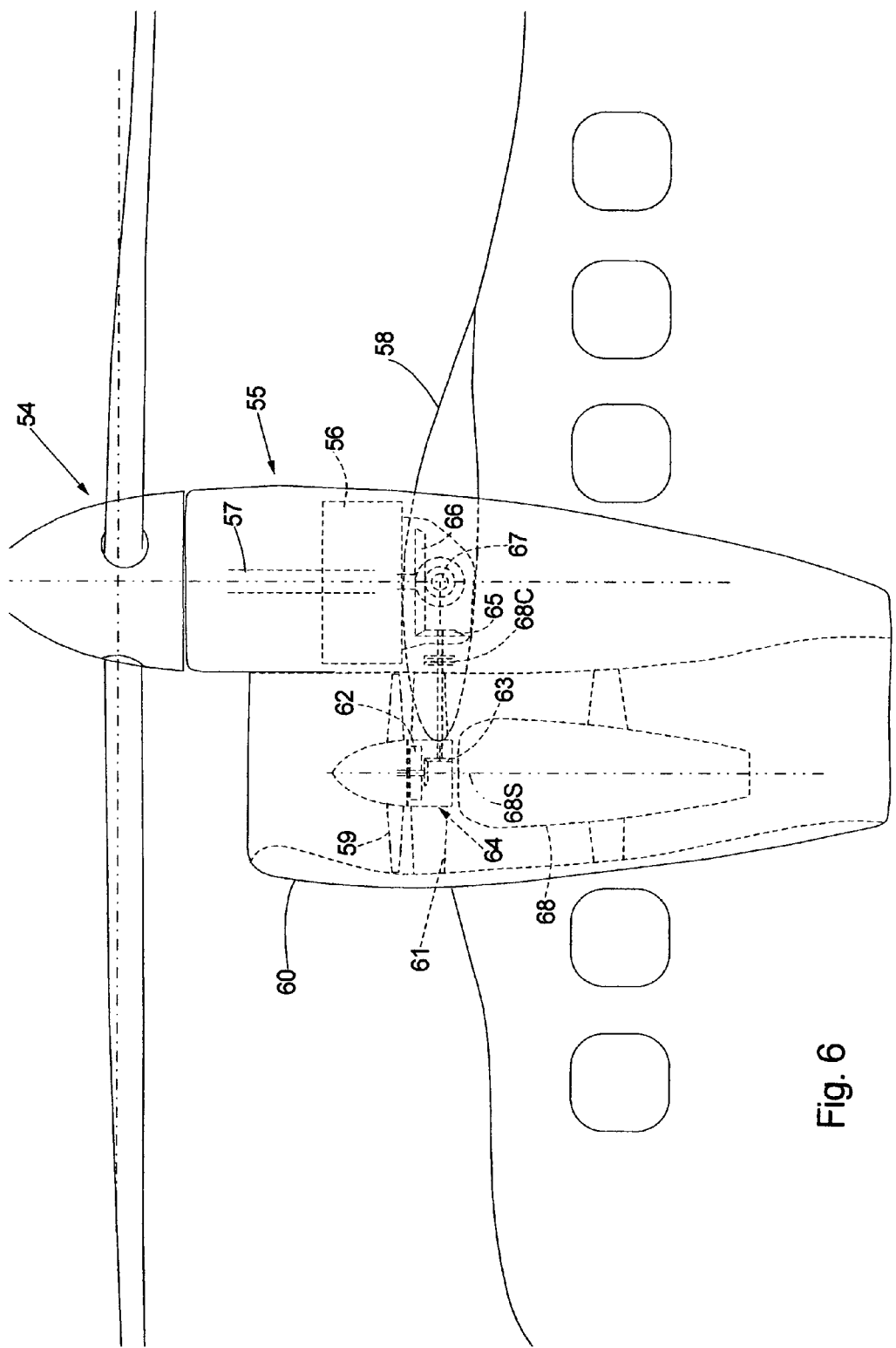
FIG. 6 reveals adaptation of turbofan-powered-in-flight-featherable but slowly turning tiltable rotors to wing-mounted twin tilt-rotor convertiplanes.

In FIG. 6, there is shown a side view of a large-sized transport-type VTOL convertiplane with twin wing-mounted tiltable rotors 54 supported by power pod 55 that is adjacent to and is powered by a core turbine engine 68, analogous to the current V-22 design. The difference here is that the core turbine engine 68 also powers a large size fan disc similar to current turbofan engine design. Rotational power from turbine engine 68 via engine output shaft 68S enters a 90-degree gear reduction unit 64 wherein horizontal rotational output will be transferred to the rotor transmission unit 56 of the power pod 55. Within transmission unit 56, there will be another set of reduction gears for 90-degree transfer of power up to the 2-stage planetary gear reduction for final output to rotor shaft 57. Both tiltable rotors are interconnected via shaft 67 similar to current design of the V-22 for synchronization of both rotors in the event of failure of an engine. Interruption the power flow from engine 68 to rotor transmission 56 during cruising flight is a clutch 68C attached to shaft 68S. Clutch 68C may be constructed by any suitable designs well-known in the art of engine transmission. Interruption of power flow between engine 68 and fan disc 59 is a power-interruption means 62 disposed between engine 68 and fan disc 59, that would be useful during the VTOL mode when power must be taken away from fan disc 59 in order to power the rotors 54. On more detail analysis, even in the VTOL mode, some airflow past the fan disc 59 would be necessary for external cooling of the engine 68 and to mix with the very hot exhaust gas from the core-turbine 68 for a cooler overall exhaust in order to avoid melting of the pavement. Furthermore, the spinning fan disc 59 is necessary to act as a centrifugal inertial particle separator to keep debris of visible size from entering the air intake of the core turbine 68 that can damage it, especially during VTOL takeoff, there will be potential for a lot of debris blasted upward due to the down draft of the rotors and engine exhaust. For that reason, a power-interruption means in the form of a planetary-geared two-speed or multi-speed transmission unit 62 between the fan disc 59 and engine 68 would be highly desirable. Detail construction and operation of this speed reduction unit 62 is not illustrated here since it is well known in the art of automobile automatic transmission, wherein there exist a sun gear at the center, a set of planetary gears held together by a holder allowing them to orbit the sun gear at a regularly spaced-apart distance, and the ring gear on the periphery of the planetary gears. In this case, the sun gear is splined to the engine output shaft 68S, and the planetary gears holder outputs to the fan disc 59, while the ring gear is attached to a first clutch unit that allows it either to rotate within the casing of the transmission unit or to be affixed to the casing of the turbofan transmission unit 62. A second clutch mechanism is placed in the planetary gears holder allowing the planetary gears either to rotate around the sun gear or the planetary gears to stop rotating altogether.

In operation, if the planetary gears are allowed to rotate by releasing the second clutch and the ring gear is fixed to the casing by engaging the first clutch, then output from the engine 68 to the sun gear will make the planetary gear set which are attached to the fan disc 59 to rotate around the sun gear at a reduced rpm in comparison to the rpm of the sun gear. The reduction ratio is defined by the ratio of the diameter of the ring gear versus the diameter of the sun gear. If the ring gear is 2.5 times wider than the sun gear, then the fan disc will turn only 0.4 times the rpm of the engine shaft. The thrust output will by reduced to 0.16 times that of original output when the ratio of engine shaft rpm and fan disc rpm is 1:1. The power consumed from the engine by the fan disc, however, will be only 0.064 times that of original 1:1 ratio, since thrust output to power input ratio will increase with reduced loading on the fan disc. Assuming the turbofan thrust production is 1.3 lb/hp at maximum static thrust, now multiplied by 2.5 times increase in efficiency, we have 3.25 lb/hp at reduced fan disc rpm, still not equal to thrust/hp ratio of the tilt-rotor of about 5–6 lb/hp but when the fan only consumed ¹⁄₁₆ the power of the core turbine, the lost of VTOL thrust would be quite negligible. When the planetary gears are not allowed to turn by engaging the second clutch while the ring gear is allowed to turn by releasing the first clutch, then the sun gear, the planetary gears and the ring gear are locked together as one unit, allowing direct drive between the engine output shaft 68S and the fan disc 59 with out any wear and tear on the gears of the transmission unit, and hence, maximum engine power to the fan disc for high speed cruise. Clutch 68C between engine 68 and rotor transmission 56 is released when the rotor 54 is being feathered to maximum pitch during cruising flight, thus allowing rotor transmission 56 to rest thus incurring no wear nor stress during cruising flight, which makes up 90–95% of total flying time for missions within 600–1000 mile radius. Thus, during cruising flight, no wear nor stress will incur on any transmission or gear, with the turbofan in direct drive from the engine. This allow this type of convertiplane to approach the low operating cost and very high reliability of a turbofan jet aircraft while having comparable cruise speed and comfort level for passengers.

SUMMARY; RAMIFICATION, AND SCOPE

Accordingly, the reader will see that the single-tilt-rotor VTOL airplane of this invention is not just an aircraft with speed and range comparable to a typical high performance aircraft, but it has far greater utility than the conventional fixed-wing aircraft, and it is much safer and much more economical to operate than a comparable helicopter. By bringing the acquisition cost and operating cost of a VTOL airplane down to be competitive to that of a conventional fixed-wing airplane while maintaining high speed, range, and safety, it can be expected that the role of general aviation will be much more expanded to the vast number of frequent fliers who must now suffer the inconveniences of commercial air travel, with hub-and-spoke system causing significant delays, plus severe traffic congestion on the ground making the ground trip to the airport equally hectic. A VTOL airplane can operate from a number of vertiports scattered around numerous sub-urban locations of a metroplex thus making air travel much more rapid and convenient. The high speed and high maneuverability of the single-tilt-rotor VTOL airplane along with its low cost also make it ideal for military applications replacing the slower and more vulnerable army attack and army transport helicopters. Its high speed and long range including long loitering time make it ideal for coast guard, border patrol or drug interdiction duties, as well as search and rescue, and virtually any roles filled by the helicopters. While I have shown and described in considerable details what I believe to be the preferred form of my invention, it will be understood by those skilled in the art that the invention is not limited to such details but may take various other forms within the scope of the claims that follow.

What is claimed is:
1. In a VTOL airplane capable of a vertical takeoff and landing mode (VTOL), an autorotation mode wherein the airplane is capable of a steep but controlled and safe descent by means of a large-diameter lift rotor in an absence of engine power, as well as an efficient high-speed horizontal cruising mode, the combination comprising:
   a pair of wings disposed on opposing lateral sides of the airplane for supporting the airplane in the horizontal mode, said wing having a wing tip and a wing root,
   a horizontal stabilizing surface and a vertical fin disposed at a tail end of the airplane for providing necessary aerodynamic stability,
   a fuselage having a top, a bottom, a front section, a tail section and a longitudinal axis forming a center line running from the front section toward the tail section,
   means for controlling said airplane in the VTOL mode and in the autorotation mode in all three typical pitch, roll, and yaw axes,
   means for controlling said airplane in the horizontal cruising mode typical for a conventional airplane, comprising of ailerons, rudders and elevator.
   vertical lifting means comprising of:
      at least one tiltable lift rotor mounted on top of a power pod having a significant length, said tiltable lift rotor having a plurality of elongated and slender rotor blades radially arranged around a tiltable rotor axis, said tiltable rotor axis traverses the length of the power pod, said tiltable rotor axis is tiltable between a vertical orientation for providing vertical lift in the VTOL mode, and a horizontal orientation, for use in the horizontal cruising mode, wherein said tiltable lift rotor blades are disconnected from power and are allowed to rotate at a minimum rotational rate generally sufficient for maintaining structural integrity of the rotor blades in spite of strong force of relative wind in a high-speed cruise,
      rotor transformational means for transforming the orientation of said tiltable lift rotor between the vertical orientation and the horizontal orientation,
      engine powering means connected to said power pod, said power pod having a top end mechanically connected to said tiltable lift rotor for powering said tiltable lift rotor, said power pod is pivotably mounted to a structure of the airplane allowing tilting motion of said tiltable lift rotor,
   means for disconnecting said engine powering means from said tiltable lift rotor, for use in the horizontal cruising mode, wherein said rotor blades are allowed to rotate at said minimum rotational rate whereby significant drag reduction and rotor blade integrity can be maintained,
   horizontal propulsion means structurally separated from said tiltable lift rotor for providing horizontally-oriented thrust for use in the horizontal cruising mode, whereby higher cruise efficiency can be obtained than if said tiltable lift rotor is also used as horizontal propulsion means.

2. The VTOL airplane of claim 1 wherein the tiltable lift rotor has the rotor axis tiltable generally in a vertical plane containing the longitidinal axis of the fuselage, between a vertical orientation wherein said tiltable lift rotor rises above the fuselage for providing vertical lift in the VTOL mode, and a horizontal orientation whereby said rotor blades protrude in front of the fuselage's front section, for use in the horizontal cruising mode, said tiltable lift rotor creates a substantial reactional rotational torque to the fuselage necessitating an anti-torque means disposed at a significant distance from the tiltable lift rotor's rotational axis to counteract said rotational torque.

3. The VTOL airplane of claim 2 wherein said rotor transformational means is comprised of:
   pivoting means for pivoting the rotational axis of said tiltable lift rotor on a pivoting axis on a transverse relationship with respect to the fuselage, thereby varying a direction of lift from the tiltable lift rotor with respect to the fuselage
   translating means for moving said tiltable lift rotor with respect to the fuselage with a fore-and-aft vector component along the longitudinal axis of the fuselage, thereby allowing the tiltable lift rotor to be moved significantly forward to be in front of the fuselage when said tiltable lift rotor assumes the horizontal orientation for proper clearance of the rotor blades from the fuselage, and allowing said tiltable lift rotor to be moved significantly rearward when said tiltable lift rotor assumes the vertical orientation for proper balancing of vertical lift during a vertical take off, and, coordinating means for coordinating said pivoting means and said translating means into one control function for convenience and for preventing the rotor blades from inadvertently striking the fuselage.

4. The VTOL airplane of claim 3 wherein the translating means for sliding the tiltable lift rotor forward and backward with respect to the fuselage further comprising:

a streamlined base whereupon the power pod of the tiltable lift rotor is pivotably attached to, said base is slidable on top of the fuselage by riding on a pair of parallel guide beams having a central slot, said guide beam is firmly attached to the top of the fuselage on each lateral side to the longitudinal axis of the airplane, a pair of metallic shoes each supporting a lower end of said base, said shoe is slidingly fitted within the central slot of said guide beams and is lubricated for low-friction sliding motion, motive means for powering the sliding action of said base and said power pod thereby resulting in translational motion of the tiltable lift rotor with respect to the fuselage.

5. The VTOL airplane of claim 4 wherein there is provided locking means for tightly locking the metallic shoes with respect to the guide beams thereby preventing translational motion and potential vibration between adjoining parts.

6. The VTOL airplane of claim 4 wherein the pivoting means for the tiltable lift rotor is further comprised of a telescopic actuator hingedly attached to the power pod and to the streamlined base.

7. The VTOL airplane as defined in claim 1 or claim 2 wherein the tiltable said blade has a built-in degree of blade twist from root to tip, said degree of blade twist is set to be significantly lower than the typical blade twist of a typical airplane propeller in cruise, thereby resulting in significantly increase in efficiency in both the VTOL mode and the autorotation mode.

8. The VTOL airplane as defined in claim 7 wherein the engine powering means is comprised of an internal-combustion engine, the combination further comprising:

a horizontally-oriented propeller of significantly smaller size than the tiltable lift rotor, said propeller is powered by said engine thereby serving as horizontal propulsion means, transmission means connecting said engine to said tiltable lift rotor for providing vertical lift to the airplane during the VTOL mode, clutch means disposed between said engine and said transmission for connecting and disconnecting said engine to said tiltable lift rotor in the VTOL mode and both the horizontal cruising mode and autorotation mode, respectively, thereby improving efficiency in all three mode of VTOL, cruising, and autorotation.

9. The VTOL airplane as defined in claim 8 wherein the engine is fixedly attached to the fuselage behind the wing, thereby reducing noise and vibration to the airplane's cabin.

10. The VTOL airplane of claim 2 wherein the anti-torque means comprising:

a tail rotor comprising of a propeller oriented perpendicular to the airplane's longitudinal axis and is disposed at the tail section of the airplane, a drive shaft for transmitting power from the engine to the tail rotor, clutch means for engaging said tail rotor to the engine in the VTOL mode and for disengaging said tail rotor from said engine in the horizontal cruising mode.

11. In a VTOL airplane capable of a vertical takeoff and landing mode (VTOL) as well as an efficient horizontal cruising mode, the combination comprising:

a pair of wings disposed on opposing lateral sides of the airplane for supporting the airplane in the horizontal mode, said wing having a wing tip and a wing root, a horizontal stabilizing surface and a vertical fin disposed at a tail end of the airplane for providing necessary aerodynamic stability in horizontal cruising mode, a fuselage having a top, a bottom, a front section, a tail section and a longitudinal axis forming a center line running from the front section toward the tail section, means for controlling said airplane in the VTOL mode in all 3 typical pitch, roll and yaw axes, means for controlling said airplane in the horizontal cruising mode typical for a conventional airplane, comprising of ailerons, rudders and elevator.

vertical lifting means comprising of:

a main tiltable rotor mounted on top of a power pod having a significant length, said main tiltable rotor having a plurality of elongated rotor blades radially arranged around a main rotor axis, said main rotor axis traverses the length of the power pod, said main rotor axis is tiltable generally in a vertical plane containing the longitudinal axis of said fuselage, between a vertical orientation wherein said main rotor rises above the fuselage for providing vertical lift in the VTOL mode, and a horizontal orientation whereby said main prop-rotor blades protrude in front of the fuselage's front section, for use in the horizontal cruising mode, translating means for sliding the main tiltable rotor forward and backward with respect to the fuselage to allow for clearance of the rotor from the front section of the airplane, further comprising:

a streamlined base whereupon the power pod of the main rotor is pivotably attached to, said base is slidable on top of the fuselage by riding on a pair of parallel guide beams having a central slot, said guide beam is firmly attached to the top of the fuselage on each lateral side to the longitudinal axis of the airplane, a pair of metallic shoes each supporting a lower end of said base, said shoe is slidingly fitted within the central slot of each of said guide beams and is lubricated for low-friction sliding motion, motive means for powering the sliding action of said base and said power pod thereby resulting in translational motion of the main rotor with respect to the fuselage.

pivoting means for the main rotor for tilting of said rotor between the vertical orientation and the horizontal orientation, engine powering means connected to said power pod, said power pod having a top end mechanically connected to said main rotor for powering said main prop-rotor, said power pod having a lower end pivotably connected to a structural member of the fuselage, said powering means generates a reactive torque in the yaw axis on the fuselage as a resulting of turning said main rotor in the vertical orientation, yaw-control means for countering said yaw-axis reactive torque effect from said power means, and, horizontal propulsion means for providing horizontally-oriented thrust for use in the horizontal cruising mode.

12. The VTOL airplane of claim 11 wherein there is provided locking means for tightly locking the metallic shoes with respect to the guide beams thereby preventing translational motion and potential vibration between adjoining parts.

13. The VTOL airplane of claim 11 wherein the pivoting means for the main rotor is further comprised of a telescopic actuator hingedly attached to the power pod and to the streamlined base.

* * * * *